US007836172B2

(12) United States Patent
Allen et al.

(10) Patent No.: US 7,836,172 B2
(45) Date of Patent: Nov. 16, 2010

(54) MESSAGE DELIVERY DOWNGRADING ANNOTATIONS

(75) Inventors: Nicholas Alexander Allen, Redmond, WA (US); Erik Bo Christensen, Shoreline, WA (US); Stephen James Millet, Edmonds, WA (US); Kenneth David Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/752,459

(22) Filed: May 23, 2007

(65) Prior Publication Data

US 2008/0291909 A1 Nov. 27, 2008

(51) Int. Cl.
*G06F 15/16* (2006.01)
(52) U.S. Cl. ...................... 709/224; 709/207
(58) Field of Classification Search .............. 709/207, 709/244
See application file for complete search history.

(56) References Cited

U.S. PATENT DOCUMENTS

| 6,091,724 | A | 7/2000 | Chandra et al. | |
|---|---|---|---|---|
| 6,275,492 | B1 * | 8/2001 | Zhang | 370/392 |
| 6,480,468 | B1 * | 11/2002 | Kishigami et al. | 709/235 |
| 7,050,432 | B1 | 5/2006 | Banavar et al. | |
| 7,054,276 | B2 | 5/2006 | Kaplan | |
| 2002/0071390 | A1 * | 6/2002 | Reeves et al. | 370/235 |
| 2003/0035375 | A1 | 2/2003 | Freeman | |
| 2003/0204570 | A1 | 10/2003 | Rehof et al. | |
| 2004/0049543 | A1 | 3/2004 | Kaminsky et al. | |
| 2004/0111474 | A1 | 6/2004 | Kaler et al. | |
| 2004/0203589 | A1 | 10/2004 | Wang et al. | |
| 2006/0031234 | A1 | 2/2006 | Beartusk et al. | |
| 2007/0050444 | A1 | 3/2007 | Costea et al. | |
| 2007/0055534 | A1 | 3/2007 | Lau | |

OTHER PUBLICATIONS

OneWayBindingElement.PacketRoutable Property, MSDN, Printed Aug. 27, 2010.*
Tovirac, Julija, et al, Enhancement Schemes to P_Mul Multicasting Protocol, IEEE 3rd Workshop on the Internet, Telecommunications and Signal Processing (WITSP 2004), http://www.itr.unisa.edu.au/~julija/papers/witsp04.pdf, Dec. 20-22, 2004, 6 pages, CD-ROM 3.6, pp. 94-99, Adelaide, Australia.
Cole, Richard, et al, Randomized Protocols for Low-Congestion Circuit Routing in Multistage Interconnection Networks, http://www.eecs.harvard,edu/~michaelm/NEWWORK/postscripts/interconnect-conf.pdf, 1998, 11 pages, USA.
Fotopoulou-Prigipa, Sophia, et al, GCRP: geographic virtual circuit routing protocol for ad hoc networks, Mobile Ad-hoc and Sensor Systems, 2004 IEEE International Conference on, http://www.ececs.uc.edu/~cdmc/mass/mass2004/35211.pdf, Oct. 25-27, 2004, 10 pages (416-425), IEEE, USA.

* cited by examiner

*Primary Examiner*—Ajay Bhatia
(74) *Attorney, Agent, or Firm*—Senniger Powers LLP

(57) ABSTRACT

Selectively modifying a message delivery requirement of a datagram message at an intermediary network node between an origin and a destination. A message delivery requirement is defined for a particular message. The message delivery guarantee defines how to transmit the particular message. A downgrading intent of the particular message is provided for the message at the origin. The downgrading intent of the particular message indicates that the message delivery requirement can be bypassed. The defined message delivery guarantee, the network delivery requirement, and the provided downgrading intent of the particular message are processed at the intermediate network node. The message delivery requirement of the particular message is ignored based on the provided downgrading intent. The message is delivered via a network protocol according to the provided downgrading intent.

20 Claims, 4 Drawing Sheets

MESSAGE DELIVERY DOWNGRADING ANNOTATIONS

BACKGROUND

Computer networks allow information to be transmitted from one computer or computing device to another. For example, one or more computers are established as nodes in a network so that users from the computers in the network can communicate with each other. As networks grow larger and more complex, devices such as routers and switches are needed to route data packets from the origin node to the destination node. Some of the protocols used by the Internet, such as TCP/IP and HTTP, do not include an explicit description of the delivery requirements of a message. An intermediary router that receives a message must therefore infer its delivery requirements. The minimum requirements that the intermediary can infer is that the outgoing message delivery requirements must be at least equal to the inbound message delivery guarantees.

By way of example, consider the decision to either packet route or circuit route messages. Currently, packet routing is the predominant form of routing on the Internet. Packet routing does not preserve connection-oriented features, such as routing paths, message-delivery order, or the presence of a back channel for replies. Circuit routing does preserve the features previously mentioned but requires more resources to route messages because this method preserves the routing paths. In addition, based on the nature of the application protocol, application messages may either support or not support being treated as datagram packets. However, if an intermediary receives an application message over a connection, the intermediary device must infer that the presence of the connection is significant and use circuit routing. As such, existing circuit routing schemes are inflexible and do not provide the optimal scalability or efficiency as with packet routing.

SUMMARY

Embodiments of the invention enable the message originator to annotate that a particular message delivery requirement does not need to be retained. Aspects of the invention enable the annotations to safely pass through intermediaries that are unaware of this scheme and can be processed without understanding the message body. An annotation may indicate that the use of a continuous connection is unnecessary for the delivery of the message. If an application message supports being treated as a datagram packet, then the message originator applies the downgrade annotation indicating that packet-routing is a sufficient delivery requirement. Upon recognizing this annotation, the intermediary can choose to ignore the incoming connection-oriented delivery guarantees and instead apply a packet-routing strategy to the message.

In one aspect, embodiments of the invention overcome the limitations of current practices by defining annotations that do not presuppose a particular routing path or set of intermediaries for routing the data packets. In addition, embodiments of the invention provide the advantages of having annotations that can safely pass through intermediaries that do not understand the annotations; that the intermediaries can process an annotation without having to understand the message body contents; that the intermediaries can process an annotation before having received the entire message; that the receiving nodes or endpoints can extend the annotation system with other annotations; and that the actions of intermediaries on the annotations are transparent to the message originator and receiver.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
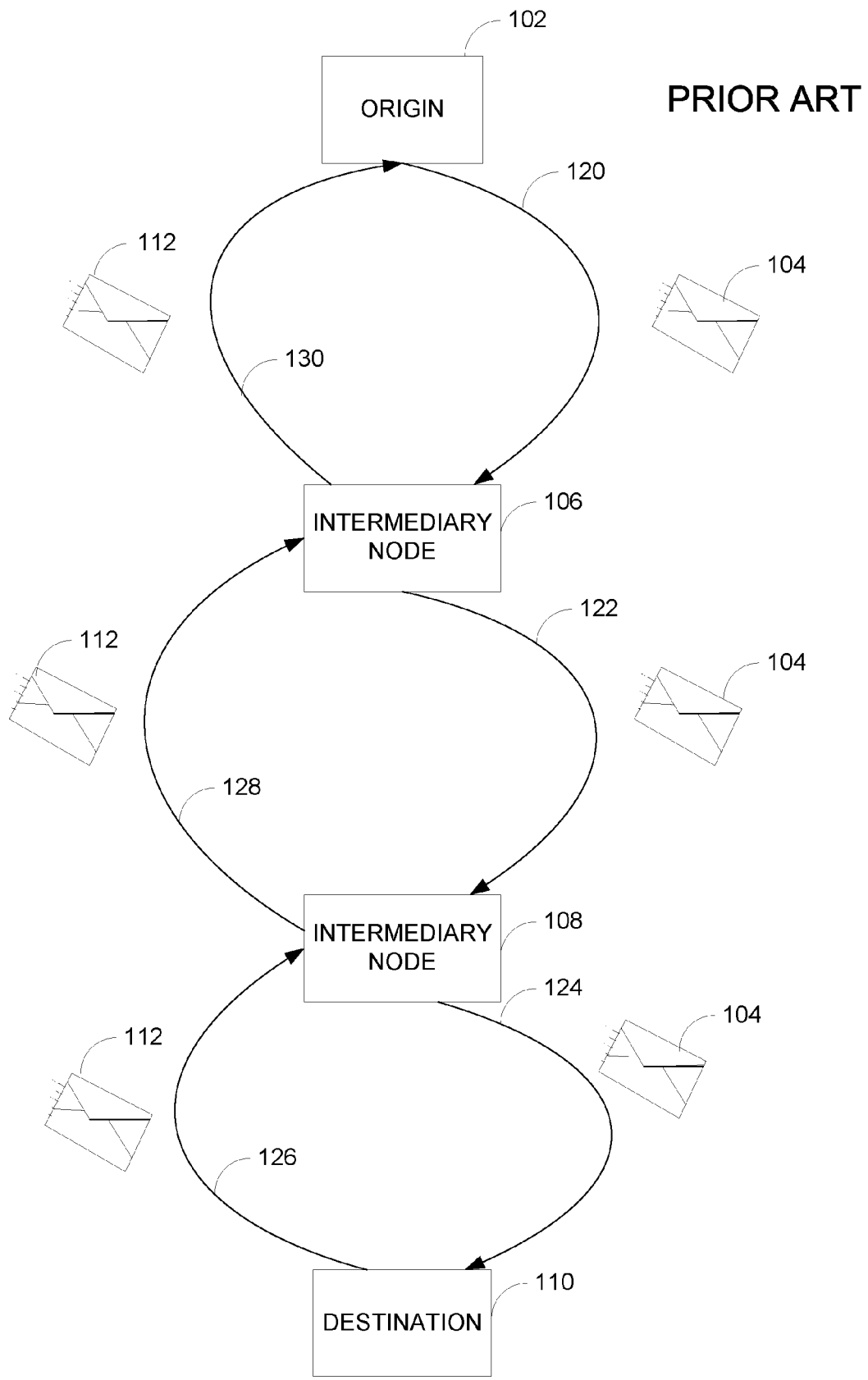
FIG. 1 is a block diagram illustrating a prior art implementation of message delivery according to a message delivery requirement.

Referring first to FIG. 1, a block diagram illustrating a prior art implementation of message delivery according to a message delivery requirement. In this simplified example, an origin 102 is a sending of a message 104 via intermediary network nodes 106 and 108 before arriving at a destination 110. As illustrated, the origin 102, the intermediary network nodes 106 and 108, and the destination 110 are connected serially. Also, the connections are made between two network hosts (i.e., the origin 102 and the destination 110) by means of the Transmission Control Protocol/Internet Protocol (TCP/IP) or HyperText Transfer Protocol (HTTP). For the sake of simplicity, the message 104 functions as a datagram. For example, a datagram or a packet is a self-contained, independent entity of data carrying sufficient information to be routed from the source to the destination computer without reliance on earlier exchanges between this source and destination computer and the transporting network.

Under the existing practice, each of the intermediary network nodes 106 or 108 needs to decide whether the message should be circuit-routed or packet-routed for the next node or "hop." As illustrated in FIG. 1, the origin 102 initially specifies a message delivery requirement for the message 104 as a circuit-routing. The origin 102 next sends the message 104 first the intermediary network node 106. An arc 120 indicates a timeline sequence as the message 104 routes to the destination 110. The intermediary network node 106 processes the message delivery requirement and determines that, based on the use of the HTTP for the initial hop, a message delivery guarantee of circuit routing is indicated, the message 104 needs to be circuit-routed to the next node or hop. As such, at a timeline 122, the intermediary network node 106 forwards the message 104 to the intermediary network node 108 for processing. Similarly, the intermediary network node 108 also processes the message delivery requirement of the message 104 and determines that a circuit-routing algorithm is to be followed. At a timeline 124, the intermediary network node 108 delivers the message 104 to the destination 110.

Because the message delivery requirement specifies circuit-routing, the connection at each node or hop needs to be opened or maintained as continuous. As such, an acknowledgement or a reply from the destination 110 to the origin 102 must follow an identical but reverse path from the destination 110 to the origin 102. Therefore, an acknowledgement message 112 travels from the destination 110 to the intermediary network node 108 at time 126; to the intermediary network node 106 at time 128, and, finally, to the origin 102 at time 130.

In the example illustrated in FIG. 1, suppose an annotation is included indicating that the use of a continuous connection is unnecessary for the safe delivery of the message 104. If an application message supports being treated as a datagram packet, then the message originator applies the downgrade annotation indicating that packet-routing is a sufficient delivery requirement. Upon recognizing this annotation, the intermediary network node (e.g., 106 or 108) can choose to ignore the incoming connection-oriented delivery guarantees and instead apply a packet-routing strategy to the message.

Because of the inflexible adherence to the message delivery requirement/guarantee, prior practices limit the performance of message delivery in a given network protocol. In addition, sometimes the message delivery requirement is not specified and each of the intermediary network nodes independently would process the message delivery requirements. Sometimes when the message delivery requirement is not specified, the intermediary network nodes need to apply expensive delivery methods to deliver the message.

Figure 2:
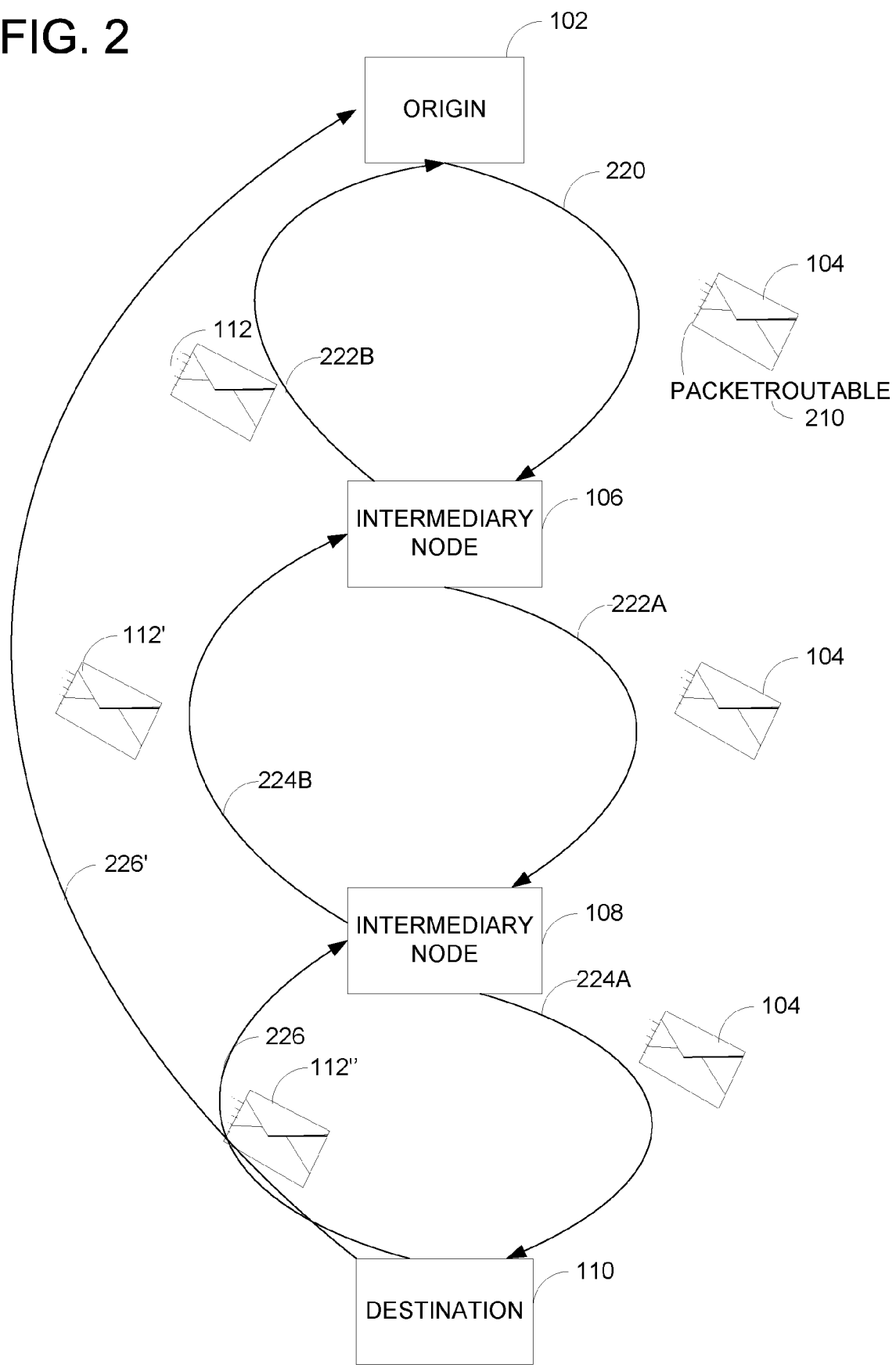
FIG. 2 is a block diagram illustrating an exemplary embodiment of selectively modifying a message delivery guarantee of a message according to an embodiment of the invention.

Embodiments of the invention overcome the shortcoming of the current practices by creating an annotation that enables the intermediary network nodes or hops to selectively modify the message delivery guarantees when processing the message. Aspects of the invention solve the described problem by allowing the message originator to explicitly describe message delivery guarantees using downgrading annotations that are unnecessary for the successful delivery of the message. FIG. 2 is a block diagram illustrating an exemplary embodiment of selectively modifying a message delivery guarantee of a message according to an embodiment of the invention.

Similar to FIG. 1, the origin 102 is a message originator intending to send the message 104 to the destination 110. In this embodiment, a downgrading annotation 210 "PacketRoutable" is specified at the origin 102 to the message 104, either in a header of the message or other suitable location. In one embodiment, the downgrading annotation 210 is attached to a message envelope associated with the message 104. The downgrading annotation 210 represents a permission to ignore a defined message delivery guarantee. In another embodiment, the downgrading annotation 210 is indicative of bypassing the message delivery guarantee during processing of the message 104. In an alternative embodiment, the downgrading annotation 210 represents permission to ignore circuit-routing requirements.

The message originator and message receiver or the destination may have shared knowledge of the delivery requirements of application messages. Any intermediaries along the routing path do not have this knowledge. Potentially, some of the machines (i.e., intermediary network nodes) along the routing path have knowledge of this annotation. For example, the intermediary network nodes are configured with knowledge of the PacketRoutable annotation or header, the nodes will look for messages that have it, packet route those messages and circuit route connections that do not have it. On the other hand, if the intermediary network nodes are not configured with knowledge of the PacketRoutable annotation or header, the intermediary nodes will circuit route or packet route depending on the transport/binding being used.

Whenever the message originator can guarantee that messages are datagrams, it attaches the PacketRoutable annotation to the message envelope in the header section. Understanding or processing of this header by intermediaries or the message receiver is not required, and the message originator does not indicate the header as mandatory to be understood for processing. Each message transmitted by the message originator subject to this message delivery requirement must be similarly marked unless there is some external correlating factor permitting the annotation to be elided or omitted. For example, a sender over a TCP/IP protocol may initiate a first message to a receiver in which the message includes a header that may include an external correlating rule/factor. The external correlating rule/factor may indicate that all future messages over the same TCP/IP protocol between the sender and the receiver will be processed according to packet routing or another downgrading annotation.

Referring back to FIG. 2, as the origin 102 sends the message 104 to the destination 110, a series of messages sent on a continuous connection to the intermediary network nodes sharing a correlation session identifier may be inferred to share the connection-preservation requirements of the first message. In one embodiment, either all of the messages or none of the messages in the series may be treated as datagrams. In one aspect, if an intermediary network node takes advantage of the downgrading annotation 210 to break the series of messages up among multiple outgoing connections, then it must alter the messages such that the annotation is present for each outgoing session. In the case of a router not understanding the annotation, the continuous connection of the message series must necessarily have been preserved by the requirements of circuit routing and no special action by the router is required. Alternative embodiments achieve the benefits of having the intermediary network nodes processing a downgrading annotation without having to understand the message body content or having the intermediate network node processing a downgrading annotation before having received the entire message.

At a time 220, the origin transmits the annotated message 104 to the first hop 106, which in this example uses HTTP to an intermediary router. The router begins reading the message beginning with the envelope and message headers. If the router does not understand the PacketRoutable annotation, then processing proceeds as depicted in FIG. 1. If, on the other hand, the router 106 understands the annotation, then the router 106 immediately decides to downgrade the message delivery requirements by dropping circuit routing requirements without having to read or process any more of the message. To downgrade circuit routing, the router acknowledges receipt of the message and completes the HTTP request-response conversation once the message is received. Decoupled from this acknowledgement, the router 106 forwards the message to the next hop. At time 222A, the message is forwarded to the next intermediary network node 108. Due to the packet-routing or the closure of the connection, the intermediary network node 106 immediately dispatches an acknowledgement 112 at time 222B, which is substantially simultaneous from the time 222A.

As such, embodiments of the invention provide more efficient and faster message processing, and the actions of the intermediary network nodes on the downgrading annotations are transparent to the origin 102 and the destination 110.

Similarly, the intermediary network node 108 processes the message and identifies the specified downgrading annotation 210. The intermediary network node 108 forwards the message 104 to the destination 110, closes the HTTP connection, and sends an acknowledgement 112' back to the origin 102. At the destination 110, once the message 104 is received and processed, an acknowledgement 112" is returned. It is to be noted that the destination 110 may send the acknowledgement 112" at time 226 or 226'. This is possible due to the fact that the message delivery requirement has been altered by the downgrading annotation 210.

Figure 3:
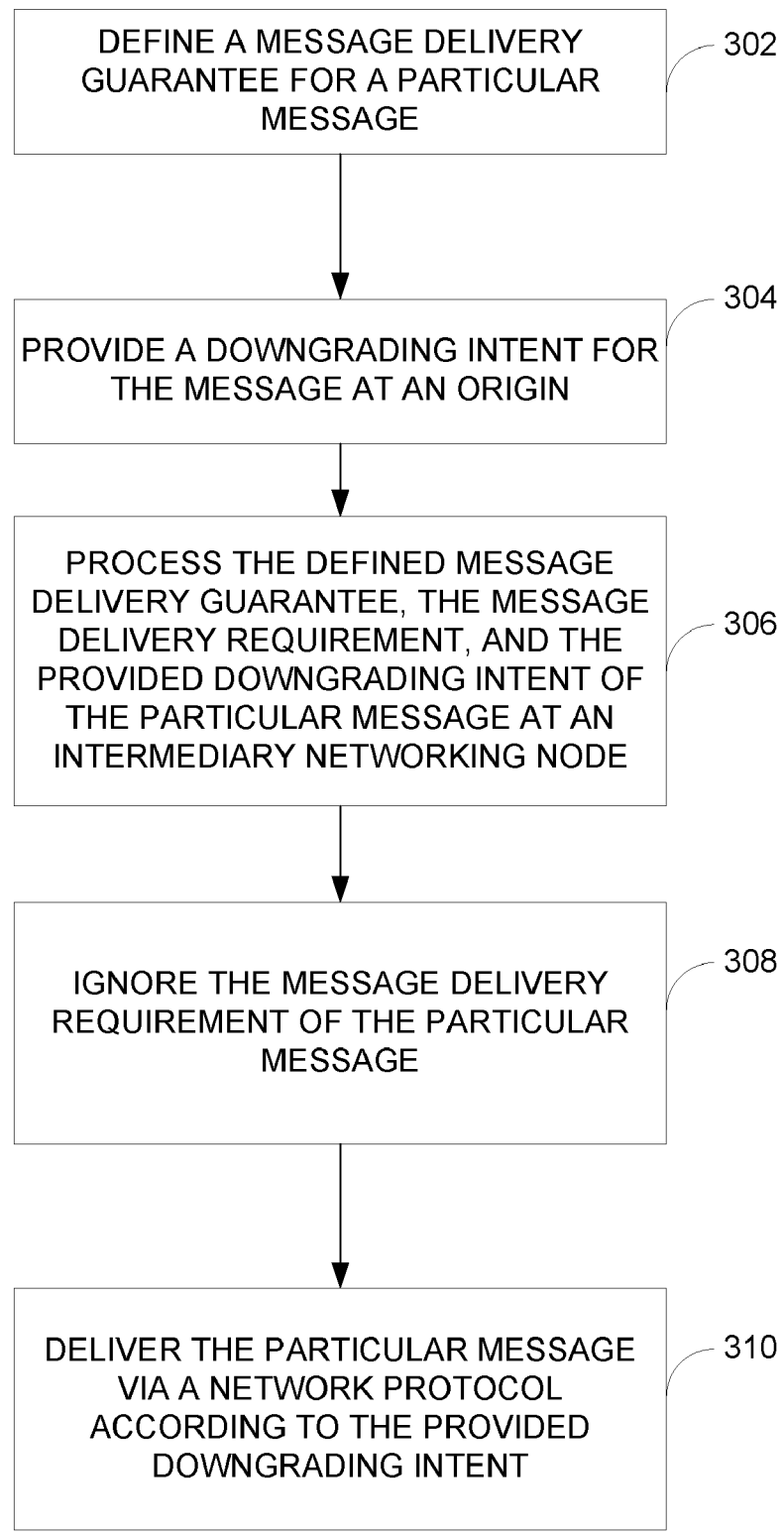
FIG. 3 is an exemplary flow chart illustrating operation of selectively modifying a message delivery requirement according to an embodiment of the invention.

Referring now to FIG. 3, an exemplary flow chart illustrates operations of selectively modifying a message delivery requirement according to an embodiment of the invention. At 302, a message delivery guarantee is defined for a particular message. The message delivery guarantee defines how to transmit the particular message. A downgrading intent for the message is provided at the origin at 304. The downgrading intent indicates that the message delivery requirement can be bypassed. In one embodiment, the provided downgrading intent may be embodied in an external correlating rule. The external correlating rule establishes a uniform rule for delivery of subsequent messages from the same origin to the destination such that the downgrading intent is applied to the subsequent messages without processing each of the subsequent messages individually at a later time or when the subsequent messages are received. In another embodiment, the downgrading intent may be embodied in a downgrading annotation in a message header of the particular message indicative of a packet-routing capability or other routing methods for successfully delivering the message.

The defined message delivery guarantee, the message delivery requirement, and the provided downgrading intent of the particular message are processed at an intermediate network node at 306. At 308, the message delivery requirement of the particular message is ignored based on the provided downgrading intent. The particular message is delivered via a network protocol according to the provided downgrading intent at 310.

Figure 4:
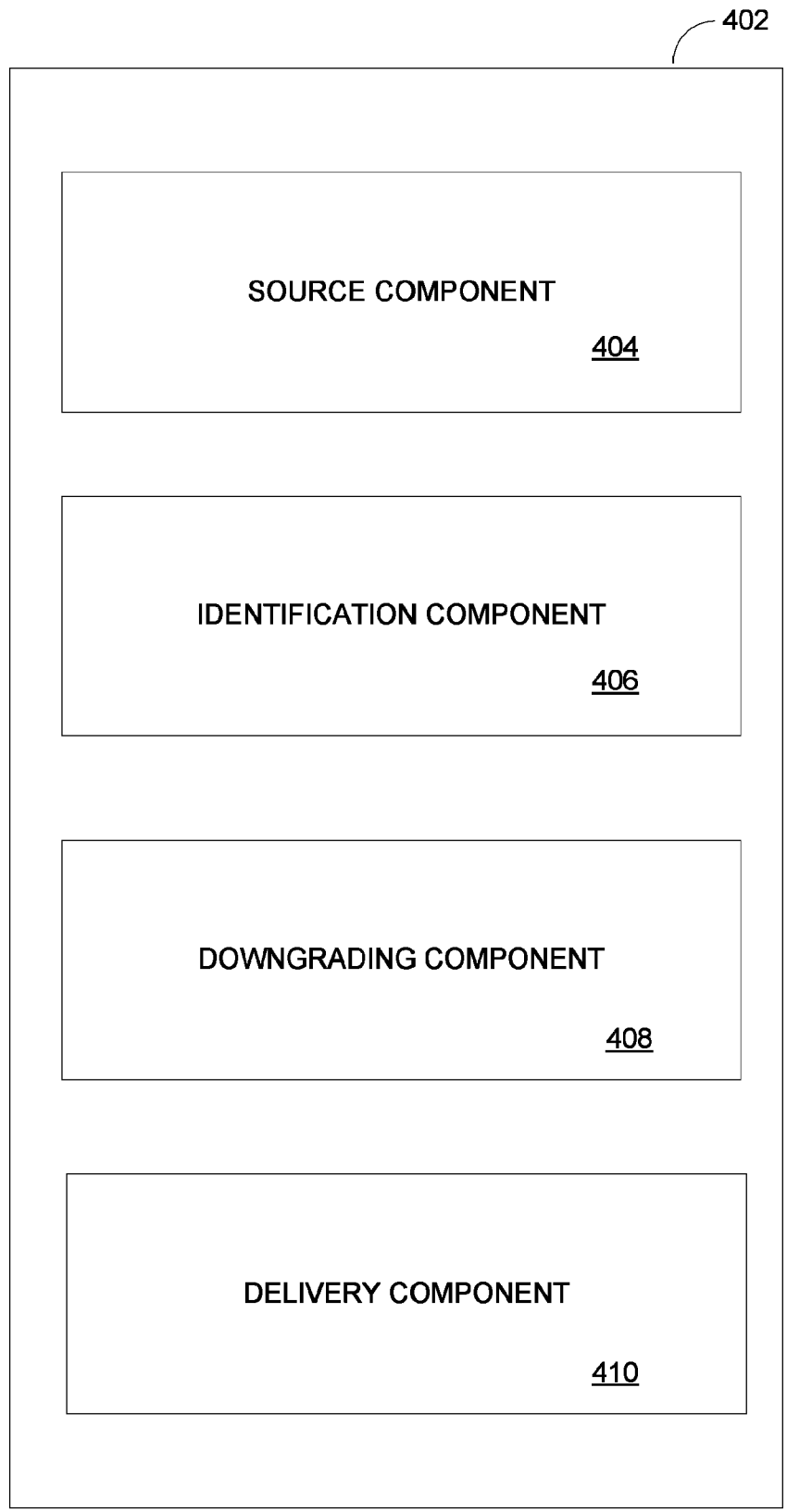
FIG. 4 is a block diagram illustrating an exemplary computer-readable medium on which aspects of the invention may be stored.

Referring now to FIG. 4, a block diagram illustrates an exemplary computer-readable medium 402 on which aspects of the invention may be stored. For example, the computer-readable medium 402 includes computer-executable components for selectively modifying a message delivery requirement of a message. A source component 404 sends the message, and the source component 404 specifies a downgrading intent indicative of bypassing a message delivery requirement of the message. An identification component 406 processes the downgrading intent. A downgrading component 408 ignores the message delivery requirement of the message according to the downgrading intent. A delivery component 410, responsive to the downgrading component 408, delivers the message to a destination (e.g., destination 110) according to the downgrading intent.

In an alternative embodiment, the source component specifies a downgrading annotation including the downgrading intent in a message header of the particular message indicative of a packet-routing capability for successfully delivering the message. In a further alternative embodiment, the source component is configured to provide the downgrading intent in an external correlating rule. The external correlating rule establishes a uniform rule for delivery of subsequent messages from the same origin to the same destination such that the downgrading intent is applied to the subsequent messages without processing each of the subsequent messages individually at a later time or when subsequent messages are received.

In another embodiment, the computer-readable medium 402, which includes both volatile and nonvolatile media, removable and non-removable media, may be any available medium that may be accessed by a computing device. By way of example and not limitation, computer readable medium comprise computer storage medium and communication medium. Computer storage medium includes volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by a computing device. Communication medium typically embodies computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication medium. Combinations of any of the above are also included within the scope of computer readable media.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer executable method of selectively modifying a message delivery requirement of a datagram message at an intermediary network node between an origin and a destination, said node unaware of said message delivery requirement, said method comprising instructions executable by a processor of the node, said instructions comprising:

receiving a datagram message at the node;

estimating the message delivery requirement for the received message based on available capabilities/resources used during a previous hop, said estimated message delivery requirement defining how to transmit the received message;

determining a downgrading intent for the received message, said downgrading intent attached to the datagram message by the origin and different from the message delivery requirement, said downgrading intent indicating that the estimated message delivery requirement can be bypassed by the node;

selectively ignoring the estimated message delivery requirement of the received message based on the determined downgrading intent; and thereafter transmitting the received message via a network protocol according to at least one of the message delivery requirement and the determined downgrading intent.

2. The method of claim 1, wherein the message delivery requirement includes a circuit-routing requirement.

3. The method of claim 1, wherein transmitting the received message via the network protocol comprises delivering the received message via one of the following network protocols: Transmission Control Protocol/Internet Protocol (TCP/IP) and Hypertext Transfer Protocol (HTTP).

4. The method of claim 1, wherein the estimated message delivery requirement comprises a continuous connection to and from the intermediary network node.

5. The method of claim 4, wherein the continuous connection comprises an open connection for a reply message after the message is delivered.

6. The method of claim 1, wherein the downgrading intent comprises a downgrading annotation indicative of the downgrading intent in a message header of the received message, said downgrading annotation further indicative of a packet-routing capability for successfully transmitting the received message.

7. The method of claim 6, wherein the downgrading annotation further comprises an external correlating rule, said external correlating rule establishing a uniform rule for delivery of subsequent messages from the origin to the destination via the node such that the downgrading intent is applied to subsequent messages by the origin without processing each subsequent message individually.

8. A system for selectively modifying a particular message delivery requirement during transmission of a message, said system comprising:

an origin for sending the message, wherein the origin determines the message is a datagram and provides a downgrading intent for the message, said downgrading intent indicative of permission to bypass an estimated message delivery requirement of the message, said downgrading intent different from said message delivery requirement;

one or more intermediary network nodes for processing the downgrading intent of the message, said one or more network nodes situated between the origin and a destination and providing intermediary stops that the message will pass through before being delivered to the destination, wherein the one or more network nodes are unaware of the message delivery requirement, wherein the one or more intermediary network nodes estimate the message delivery requirement of the message based on available capabilities/resources used during a previous hop, as the estimated message delivery requirement, wherein the one or more network nodes selectively bypass the estimated message delivery requirement of the message and transmit the message according to at least one of the message delivery requirement and the downgrading intent.

9. The system of claim 8, wherein the origin is configured to provide an external correlating rule indicative of the downgrading intent, said external correlating rule establishing a uniform rule for delivery of subsequent messages from the origin to the destination such that the downgrading intent is applied by the origin to subsequent messages without processing each subsequent message individually.

10. The system of claim 8, wherein the message delivery requirement comprises a circuit-routing requirement for delivering the message.

11. The system of claim 8, wherein the message delivery requirement comprises maintaining a continuous connection between the origin, the destination, and the one or more intermediary network nodes.

12. The system of claim 11, wherein the continuous connection comprises an open connection for a reply message after the message is delivered.

13. The system of claim 8, wherein the one or more intermediary network nodes transmit the message via a network protocol which comprises one of the following network protocols: transmission Control Protocol/Internet Protocol (TCP/IP) and hypertext transfer protocol (HTTP).

14. The system of claim 8, wherein the origin is configured to specify a downgrading annotation indicative of the downgrading intent in a message header of the message, said downgrading annotation further indicative of a packet-routing capability for successfully delivering the message.

15. A computer-readable storage medium having computer-executable components for selectively modifying a particular message delivery requirement during transmission of a message by an intermediate node, said computer-executable components comprising:

an identification component for processing the a downgrading intent of a received message, said downgrading intent indicative of bypassing an estimated message delivery requirement of the received message, said downgrading intent different from a message delivery requirement of the received message;

a downgrading component for selectively ignoring the message delivery requirement of the message according to the downgrading intent; and a delivery component, responsive to the downgrading component, for delivering the message to a destination according to at least one of the message delivery requirement and the downgrading intent.

16. The computer-readable medium of claim 15, wherein the downgrading intent is an external correlating rule, said external correlating rule establishing a uniform rule for delivery of subsequent messages from an origin to a destination such that the downgrading intent is applied to subsequent messages by the origin without processing each subsequent message individually.

17. The computer-readable medium of claim 15, wherein the intermediate node is situated between an origin and a destination, and wherein the message delivery requirement includes a continuous connection between the origin, the destination, and the intermediate node.

18. The computer-readable medium of claim 17, wherein the continuous connection comprises an open connection for a reply message after the message is delivered.

19. The computer-readable medium of claim 15, wherein the delivery component delivers the message via a network protocol which comprises one of the following network protocols: Transmission Control Protocol/Internet Protocol (TCP/IP) and HyperText Transfer Protocol (HTTP).

20. The computer-readable medium of claim 15, wherein the the downgrading intent is specified in a message header of the message and is indicative of a packet-routing capability for successfully delivering the message.

\* \* \* \* \*